United States Patent Office 3,302,675
Patented Feb. 7, 1967

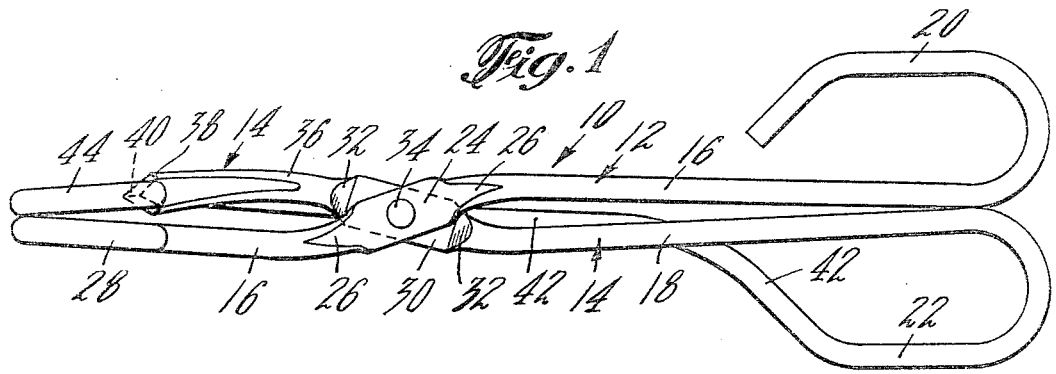
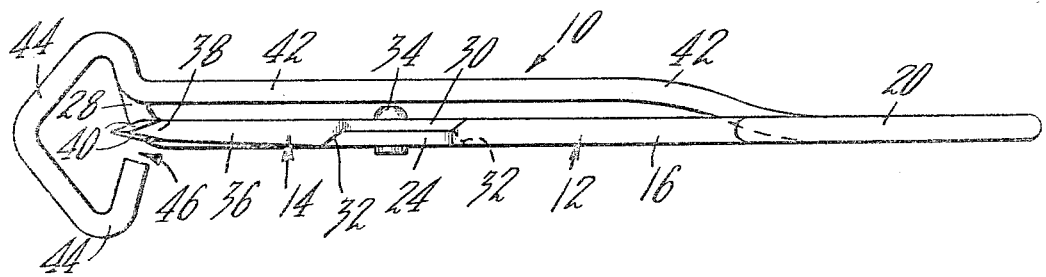
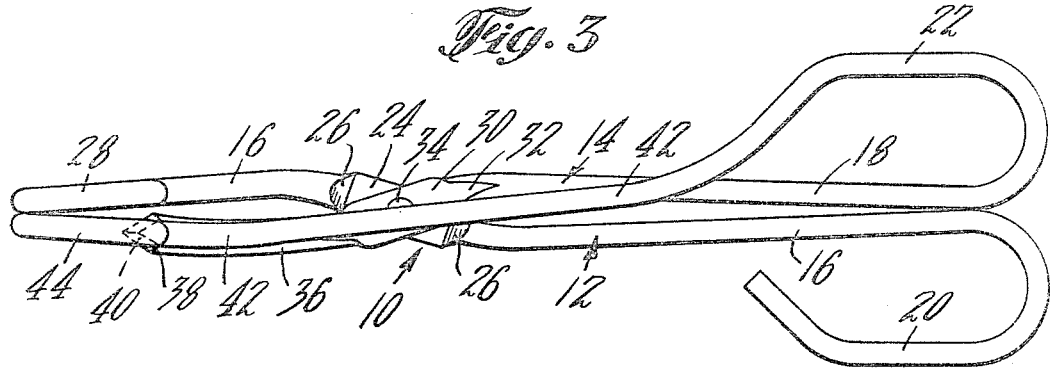
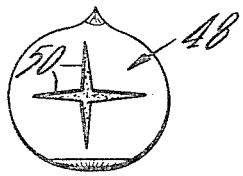
INVENTOR.
FRANCES A. ODLER

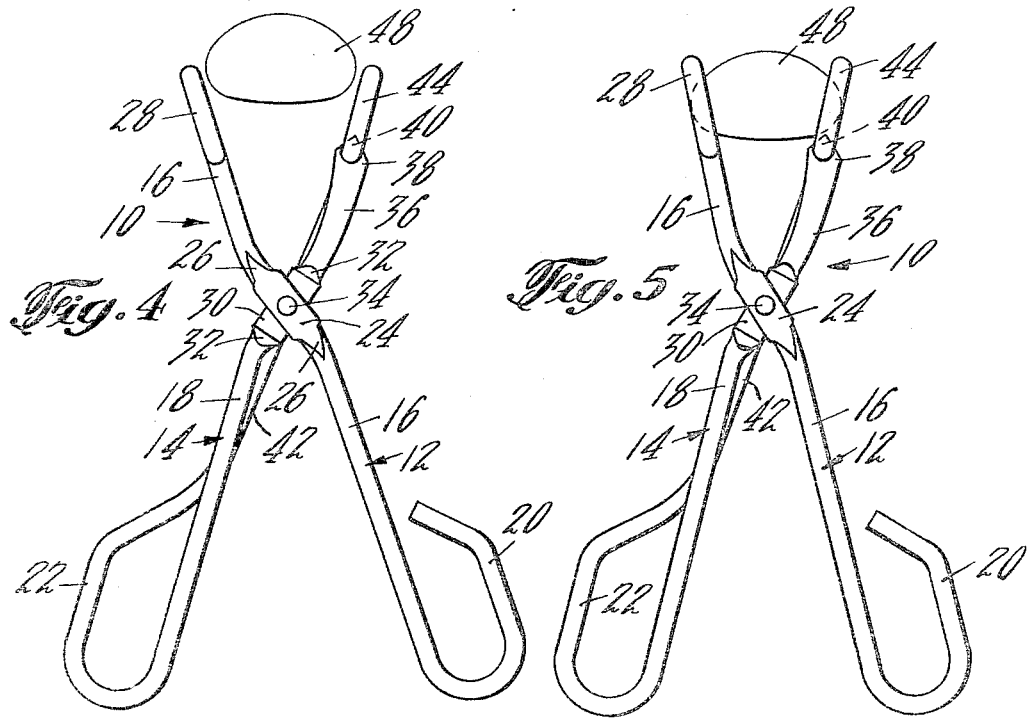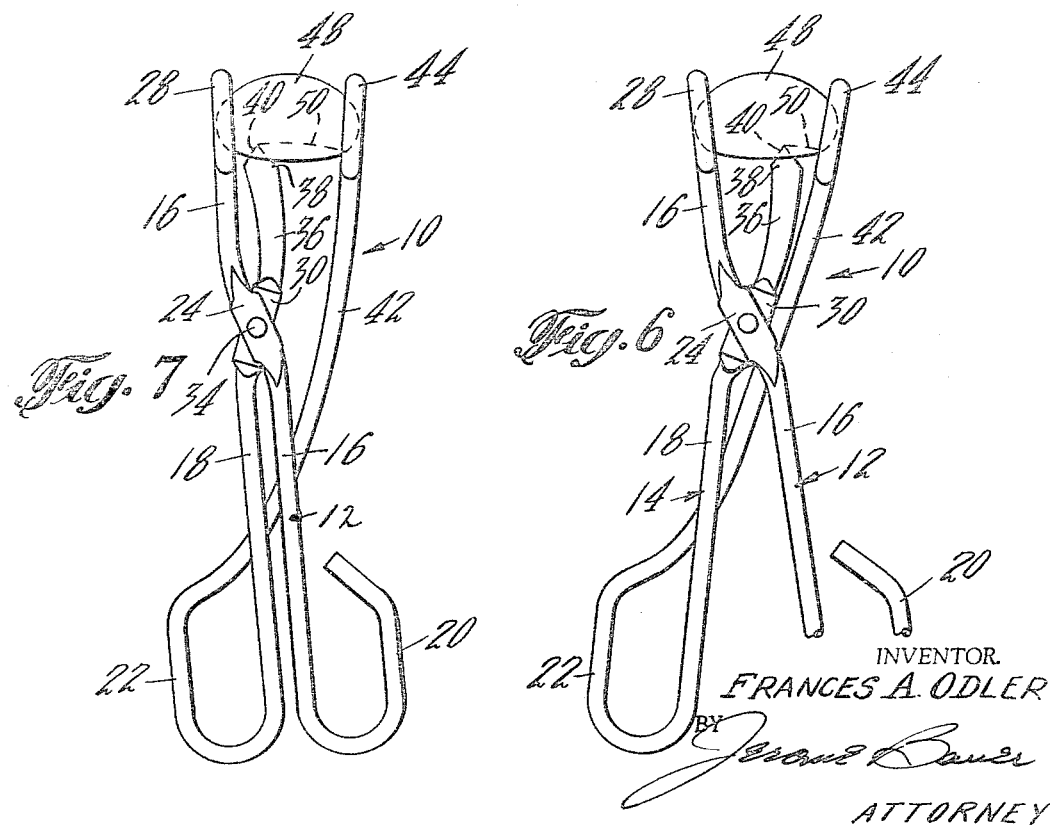

3,302,675
NUT HOLDING AND CUTTING TOOL
Frances A. Odler, 59 Astor Court,
Commack, N.Y. 11725
Filed Jan. 22, 1965, Ser. No. 427,404
10 Claims. (Cl. 146—13)

This invention relates to a nut piercing and cutting tool and, particularly, to a cutting implement for piercing and slitting nuts such as chestnuts.

It is a customary procedure when roasting nuts, such as chestnuts, to cut an incision into the shell. This is necessary because of the moisture contained in the chestnut. Heating causes the chestnut to expand and the shell to burst, unless there is an open area for the gasses to escape. Therefore, before roasting chestnuts, a transverse cut is made into the shell. This is normally done with a knife blade by the person roasting the chestnut. Obviously, such process is dangerous, since the knife must be sharp and may slip from the smooth outer surface of the chestnut to injure the user. It is also time consuming to balance the chestnut between the fingers of one hand while using the knife with the other. These deficiencies are overcome by the present invention which both holds the chestnut in position and permits the cross-slit incisions to be made quickly, easily and without fear of injury.

It is an object of the invention to provide a cutting instrument which both holds in position and cuts into the shells of nuts such as chestnuts or the like.

It is still another object to provide a chestnut holding and piercing tool which is constructed of but two separate elements, cooperatively held together for the purpose of the invention.

Another object is to eliminate the danger of injury to the person who ordinarily cuts into the chestnut with a short-bladed knife and thereby risks the danger of the knife slipping on the shell of the chestnut, resulting in cuts of the fingers and hand.

A further object is to provide a nut piercing tool or implement which is inexpensive to manufacture and is constructed of readily procurable material.

It is a further object to provide a tool which is simple to manipulate with a minimum of moving parts whereby children as well as adults are equally capable of utilizing it.

Other and further objects of this invention reside in the structures and arrangements hereinafter more fully described with reference to the accompanying drawing in which:

FIG. 1 is a top plan view of the chestnut cutting tool of the invention,

FIG. 2 is a side elevation of the cutting tool and clearly shows the piercing element, FIG. 3 is a bottom plan view of the invention and illustrates the continuous formation of the piercing element which is so positioned as to avoid injury to the user thereof, FIGS. 4 to 7 illustrate the sequence in operation of the cutting tool whereby the chestnut is held by the device and is also cut thereby, and FIG. 8 illustrates substantially the cruciform shape of the pierced shell of the chestnut when the cutting operation is completed.

Referring to the figures, and particularly to FIGS. 1 to 3, the tong or plier-like cutting implement or tool 10 is generally identified and is constructed of two separate plier-like elements generally identified by the numerals 12 and 14. These plier-like elements are partially of identical construction and comprise the elongated lever arm members 16 and 18 which are suitably formed to provide enlarged loop portions 20 and 22 respectively at one extremity thereof whereby the fingers of the person using the tool may be inserted in the manner of operating a conventional pair of scissors. Up to this point, the plier-like elements 12 and 14 are similar.

The other end of the lever 16, opposite the loop 20, is flattened at 24 and is undercut or contoured at 26 as is shown in FIG. 3, for a purpose soon to become apparent. The lever arm member 16 extends a short distance beyond the flattened structure 24 and terminates in a hollow, spade-like loop or gripping jaw member 28.

The lever arm member 18 also is provided with a flattened structure 30, similarly undercut and contoured at 32 in the manner of the lever 16, except in opposed relation thereto, so they can be riveted together at 34. This enables a scissor-like relative motion of the lever arm members 16 and 18 while the same lie in the same plane. However, the lever arm member 18 extends beyond the flattened structure 30 at a slightly bowed or bent portion 36. The portion 36 terminates in a tapered cutting tip 38 projecting to a point slightly beyond the connecting portion of the gripping jaw member 28 (see FIG. 2). It should be noted that the tapered cutting tip 38 is provided with bevelled cutting edges at 40, in order to insure a clean cutting operation when the tool 10 is in use.

The material forming the looped end 22 continues therebeyond and is formed to double back adjacent to the plier-like element 14, alongside the arm 18. This doubling back portion appears as a rod-like member 42 that is slightly spaced apart and in a substantially parallel relation with respect to the lever arm 18 and the cutting element 36. The rod member 42 terminates in a hollow, spade-like loop or gripping jaw member 44 similar to and juxtapositioned in relation to the jaw member 28, as is clearly illustrated in the figures. These jaw members 28 and 44 act to hold a chestnut or other object therebetween while the cutting edge 38 is operative. The jaw member 44 also provides the safety feature mentioned heretofore.

Referring to FIG. 2, it will be seen that the same is not closed, rather it is provided with a space 46 adapted to receive for movement therethrough, the free end 38 of the cutting member 36. In the normal unstressed condition of the tool 10, the end 38 is positioned in the space 46 and thus is shielded between the jaw member 44 and rod member 42. As a result, the free end 38 is shielded from careless handling and cannot cut or stab any part of the body or hand of the person using the tool 10.

It might be well to observe at this point that the bowed shape of the cutting member 36 is so arranged as to cause it to pierce a chestnut at an angle of about 10° from the vertical, thereby aiding in carrying out the cutting operation.

The operation of the cutting or slitting tool 10 should be apparent from the illustrations in FIGS. 4 to 7. The thumb and fingers are inserted into the looped portions 20 and 22 respectively of the cutting tool 10 and they are pivoted into the open position illustrated in the drawing in FIG. 4. During this opening movement, the rod member 42, coextensive with lever 14 and element 36, move coincidental simultaneously with the element 36 pivoting about 34 while the member 42 moves alongside it. In this way, the cutting tip 38 remains shielded in the space 46. The chestnut 48 is then inserted between the jaw members 28 and 44 and the pivoted lever members 12 and 14 are urged into the closed position by finger manipulation urging the finger loops 20 and 22 together. This closing movement causes the jaws 28 and 44 to clamp around the sides of the chestnut. The hollow construction of the jaws 22 and 44 causes the sides of the chestnut to enter the looped space of the jaws and seat on and within the loops, as is illustrated in FIG. 5. As a result, both jaw members 28 and 44 seat, engage and securely grip the chestnut, preventing it from accidentally slipping when pressure is subsequently applied. This simple but novel construction distinguishes from ordinary nut crackers that rely on a serrated surface to hold a nut in position but that does not prevent the nut from slipping out the sides of the nut cracker when pressure is applied.

In the present tool 10, after sufficient pressure is applied to securely hold the chestnut at the jaw members 28 and 44, the application of additional force continues to apply pressure to the chestnut retained between the clamping jaws. However, continued pressure on the loops 20 and 22 causes the lever 14 to continue to pivot about the rivet head 34, out of the space 46, toward the jaw 28 in an arcuate path, carrying the free cutting head 38 across the bottom surface of the chestnut 48, as is evidenced in FIG. 6. Because the jaw 44 and its arm member 42 are flexibly movable independently of the pivot 34, as a result of the flexibility of the joining loop 22, its closing movement is limited by its engagement with the chestnut 48. Hence, as pressure is increased on the loops 20 and 22 to close them, the arm 42 flexes and jaw 44 moves into tighter engagement with the chestnut. In the meanwhile, the lever 14 and its end 38 continue to move. During this continued movement, the cutting surfaces 40 pierce the shell of the clamped chestnut at one end and travel arcuately across and through the same until the position of FIG. 7 is attained. The relative pivoting of the levers 12 and 14 is stopped when the portions 26 and 32 abut each other. The slightly angled arrangement of the cutting head 38 increases the facility with which the shell of the nut 48 is pierced.

When this step is completed, finger pressure is relaxed and the loops 20 and 22 are separated to release the chestnut from between the jaws. During this reverse movement, the cutting end 38 moves arcuately back away from the jaw 28, along the slit it made in the shell, and back toward the jaw 44. When it finally moves back into its normal position in the space 46, continued opening movement of the loops 20 and 22 separates the jaws and the arm 42 moves simultaneously with the adjacent lever arm 14 to release its hold on the chestnut. If a cruciform slit is desired, the chestnut is rotated 90° in the same plane and is re-positioned between the jaws 28 and 44, and the process is repeated. The cruciform slit 50 is illustrated in FIG. 8. The operation is swift and also safe against injury.

Although the cutter of the invention described for use with chestnuts, it is not to be so limited. It can be used for other nuts, such as pecans and walnuts. The cutter 36 will make an incision on these nuts if desired, or if pressure is continued to bear, will crack the shell.

The material used need not be extensive and may consist of any rigid rod-like metal drawn from a metal stock of about 1/8 to 3/8 inch thick. This will provide rigidity and flexibility for the entire instrument.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:
1. A nut shell cutting instrument comprising,
a first means for seating and gripping a nut shell,
cutting tool means pivotally secured to said seating and gripping means, and
second means for seating and gripping a nut shell,
said second means connected coextensive with said cutting tool to move coincidental therewith and flex relative thereto.

2. A chestnut piercing device comprising,
a first lever member,
a second lever member,
means pivotally securing said lever members together for scissor-like movement,
said first lever member including a loop member and a first jaw member,
said second lever member including a loop member and nut piercing means,
and a second jaw member connected with said nut piercing means,
said second jaw member being adjacent to the first jaw member and being movable therewith and relative thereto.

3. The combination of claim 2,
wherein said jaw members comprise hollow loops whereby a nut is adapted to be seated therein and clamped therebetween.

4. The combination of claim 3,
wherein said nut piercing portion includes a tapered cutting tip.

5. The combination of claim 4,
wherein said tapered cutting tip is beveled to include cutting surfaces.

6. A nut holding and cutting tool comprising, in combination,
a first plier member having a jaw portion, and
a second plier member pivotally secured to said first plier member,
said second plier member having a looped jaw portion at one end thereof and terminating in a rod-like lever member with a looped portion formed therebetween,
said looped portion retaining said second plier member and lever member in spaced apart relation with the lever member terminating in a cutting end portion.

7. A nut holding and cutting tool comprising a first lever,
a second lever,
a third lever,
said first and third levers having nut gripping means,
said second lever having nut cutting means,
means pivotally securing said first and second levers for relative plier-like movement,
and means connecting said second and third levers for coincidental movement with each other and for movement relative to each other.

8. A nut holding and cutting tool as in claim 7,
said means connecting said second and third levers being a looped portion therebetween to receive the fingers of a hand for manipulation and being operable to move said second and third levers coincidental with each other and being flexible to permit the movement of one of said second and third levers relative to each other.

9. A nut holding and cutting tool as in claim 7,
said connecting means positioning said second and third levers in spaced substantially parallel relationship with each other.

10. A nut holding and cutting tool as in claim 7,
said cutting means of said second lever normally being positioned within the confines of said nut gripping means of said third lever to shield the same.

References Cited by the Examiner

UNITED STATES PATENTS

| | | | |
|---|---|---|---|
| 1,483,456 | 2/1924 | Kroon | 146—13 |
| 1,724,049 | 2/1929 | Smith | 146—10 X |

FOREIGN PATENTS 399,769  8/1924  Germany.

WILLIAM W. DYER, JR., *Primary Examiner.*

W. GRAYDON ABERCROMBIE, *Examiner*